(12) United States Patent
Shida et al.

(10) Patent No.: US 8,080,506 B2
(45) Date of Patent: Dec. 20, 2011

(54) REACTIVE PURGE COMPOUND FOR POLYMER PURGING

(75) Inventors: Mitsuzo Shida, Long Grove, IL (US); Wen-Li Adam Chen, Rochester, NY (US)

(73) Assignee: MSI Technology LLC., Arlington Heights, IL (US)

( * ) Notice: Subject to any disclaimer, the term of this patent is extended or adjusted under 35 U.S.C. 154(b) by 107 days.

(21) Appl. No.: 12/502,556

(22) Filed: Jul. 14, 2009

(65) Prior Publication Data

US 2011/0012275 A1  Jan. 20, 2011

(51) Int. Cl.
*C11D 13/18* (2006.01)

(52) U.S. Cl. ............ 510/201; 510/245; 510/445; 134/7; 134/22.1; 134/22.12; 134/22.17

(58) Field of Classification Search .................. 510/201, 510/245, 445; 134/7, 22.1, 22.12, 22.17
See application file for complete search history.

(56) References Cited

U.S. PATENT DOCUMENTS

| | | | | |
|---|---|---|---|---|
| 2,744,841 A | * | 5/1956 | Cassis et al. | 134/7 |
| 3,071,498 A | * | 1/1963 | Kaskel | 134/7 |
| 3,119,720 A | * | 1/1964 | Stiles et al. | 134/22.19 |
| 3,776,774 A | * | 12/1973 | Miller | 134/7 |
| 3,869,525 A | * | 3/1975 | Miller | 525/177 |
| 4,731,126 A | | 3/1988 | Dixit et al. | |
| 4,823,819 A | * | 4/1989 | Schmidt | 134/104.4 |
| 4,838,945 A | | 6/1989 | Fujii et al. | |
| 4,838,948 A | | 6/1989 | Bailey | |
| 4,919,161 A | * | 4/1990 | Schmidt | 134/108 |
| 4,954,545 A | | 9/1990 | Bailey | |
| 4,976,788 A | * | 12/1990 | Nohr et al. | 134/5 |
| 5,087,653 A | | 2/1992 | Obama et al. | |
| 5,139,694 A | * | 8/1992 | Kmiec | 510/188 |
| 5,233,037 A | | 8/1993 | Nielinger et al. | |
| 5,236,514 A | | 8/1993 | Leung et al. | |
| 5,238,608 A | * | 8/1993 | Obama et al. | 510/188 |
| 5,266,694 A | | 11/1993 | Moran, Jr. | |
| 5,298,078 A | * | 3/1994 | Itoh et al. | 134/9 |
| 5,302,756 A | | 4/1994 | McKinney | |
| 5,395,974 A | | 3/1995 | McKinney | |
| 5,397,498 A | | 3/1995 | Ishida et al. | |
| 5,424,012 A | | 6/1995 | Ertle et al. | |
| 5,443,768 A | * | 8/1995 | Scheibelhoffer et al. | 264/39 |
| 5,668,277 A | | 9/1997 | Hendrix et al. | |
| 5,932,724 A | | 8/1999 | Sifniades et al. | |
| 5,958,313 A | * | 9/1999 | Yamamoto et al. | 264/39 |
| 5,965,624 A | | 10/1999 | Armstrong et al. | |
| 6,022,420 A | * | 2/2000 | Eberle et al. | 134/8 |
| 6,060,439 A | | 5/2000 | Doyel et al. | |
| 6,060,445 A | * | 5/2000 | Chandraker et al. | 510/475 |
| 6,087,494 A | | 7/2000 | Thomissen | |
| 6,235,821 B1 | | 5/2001 | Saito | |
| 6,294,120 B1 | | 9/2001 | Negi et al. | |
| 6,384,002 B1 | * | 5/2002 | Nitzsche | 510/188 |
| 6,514,922 B2 | * | 2/2003 | Waldrop | 510/188 |
| 6,530,382 B2 | * | 3/2003 | Waldrop | 134/22.1 |
| 6,673,759 B1 | * | 1/2004 | Koch et al. | 510/188 |
| 7,132,503 B2 | * | 11/2006 | Pawlow et al. | 528/480 |
| 2002/0187912 A1 | * | 12/2002 | Waldrop | 510/403 |
| 2002/0187913 A1 | * | 12/2002 | Waldrop | 510/403 |
| 2002/0193267 A1 | * | 12/2002 | Nitzsche | 510/188 |
| 2002/0198121 A1 | * | 12/2002 | Nitzsche | 510/188 |
| 2003/0221707 A1 | * | 12/2003 | Blanton et al. | 134/7 |
| 2007/0135611 A1 | * | 6/2007 | Brack et al. | 528/196 |
| 2007/0238636 A1 | * | 10/2007 | Thomson | 510/475 |
| 2010/0175720 A1 | * | 7/2010 | Ito et al. | 134/19 |

FOREIGN PATENT DOCUMENTS

| | | |
|---|---|---|
| JP | 62-176817 A | 8/1987 |
| JP | 40-11700 A | 1/1992 |
| JP | 51-24046 A | 5/1993 |
| JP | 60-13183B B | 2/1994 |

OTHER PUBLICATIONS

International Search Report and Written Opinion of the International Searching Authority for copending international patent application PCT/US2010/040646, mailed on Sep. 23, 2010.

Written Opinion of the International Preliminary Examining Authority for copending international patent application PCT/US2010/040646, mailed on Sep. 7, 2011.

* cited by examiner

*Primary Examiner* — Gregory Webb
(74) *Attorney, Agent, or Firm* — Dobrusin & Thennisch PC

(57) ABSTRACT

The present invention relates to reactive purge compound for cleaning polymer processing equipment wherein the reactive purge compound that includes
i) at least about 50 wt.% of a polymeric carrier component based on the total weight of the reactive purge compound; and
ii) a chain scission catalyst component dispersed in the polymeric carrier component;
wherein
a) the chain scission catalyst component includes a chain scission catalyst selected from the group consisting of at least one alkali metal hydroxide, at least one alkaline earth metal hydroxide, and any combination thereof;
b) the reactive purge compound further comprises a water generating component; or
c) both (a) and (b);
wherein the reactive purge compound is a feedstock material in the form of a plurality of pellets, granules, rods, powder or other particles.

24 Claims, No Drawings

US 8,080,506 B2

REACTIVE PURGE COMPOUND FOR POLYMER PURGING

FIELD OF THE INVENTION

The present invention relates generally to purge compounds including a polymeric carrier component, a chain scission catalyst component, and optionally a water generating component for cleaning polymer processing equipment and to methods of purging polymer processing equipment.

BACKGROUND

The processing of polymers and particularly polymers that are polar and/or have an affinity to metal surfaces when melted, can result in build-up of the polymer in the polymer processing equipment (e.g., on a screw or barrel, such as on an extruder, or in a die, an adapter, or other component of the processing equipment). The build-up of polymer, over time, may result in polymer being exposed to heat for an extended period of time (e.g., more than 5 times, or even more than 500 times the average residence time of the polymer in the processing equipment), such that some of the polymer changes in color or flow characteristics. As a consequence, a part being produced using a process that includes a step of processing the polymer through the processing equipment may be discolored, have non-uniform color (e.g., black specks), or have defects resulting from the change in flow characteristics. As one example, polymer that has been exposed to heat for an extended time may result in particles that block the flow of material, such as through a die.

Various methods are known in the art to purge the polymer processing equipment after running a processing resin (i.e., a polymeric material containing one or more polymers), so that the equipment does not need to be dismantled and manually cleaned. The purging may be done with a neat resin or with another processing resin to be processed into parts. Purge compounds are commercially available and are routinely employed to remove certain processing resins. Purge compounds also find utility when transitioning between processing of a first processing resin to a second processing resin.

Purge compounds disclosed in the literature include purge compounds that employ abrasives, foaming agents, surfactants, plasticizers, adhesive components such as polar polymers, to assist in cleaning the polymer processing equipment of certain processing resins. Such purge compounds are described in U.S. Pat. No. 4,731,126 (Dixit et. al., issued Mar. 15, 1988), U.S. Pat. No. 4,838,945 (Fujii et. al., issued Jun. 13, 1989), U.S. Pat. Nos. 5,236,514 (Leung et. al., issued Aug. 17, 1993), 5,424,012 (Ertle et. al., issued Jun. 13, 1995), U.S. Pat. No. 5,443,768 (Scheibelhoffer et. al., issued Aug. 22, 1995), U.S. Pat. No. 5,958,313 Yamamoto et. al., issued Sep. 28, 1999), U.S. Pat. No. 6,060,445 (Chandraker et. al., issued May 9, 2000), U.S. Pat. No. 6,294,120 (Negi et. al., issued Sep. 25, 2001) and U.S. Pat. No. 6,384,002 (Nitzsche, issued May 7, 2002), all of which are expressly incorporated herein in their entirety.

Despite the advances in purge compounds, there continues to be a need for new purge compounds that can purge a broad range of polymers, such that the number of different purge compounds needed by a polymer processor is reduced.

There is also a continued need for purge compounds that purge more efficiently such that the amount of unproductive time on the processing equipment is reduced, the amount of waste generated during the purge is minimized, or both. In particular, there continues to be a need for purge compounds that more efficiently purge polar processing resins, such as polyamides.

As such, there is a need for a new mechanism to purge processing equipment, that can be used alone, or in combination with one or more of the previously described mechanisms (such as abrasion, adhesion, foaming, and the like).

SUMMARY OF THE INVENTION

One or more of the above needs may be met with a reactive purge compound for cleaning polymer processing equipment wherein the reactive purge compound comprises: i) at least about 50 wt. % of a polymeric carrier component based on the total weight of the reactive purge compound, wherein the polymeric carrier component includes one or more polymers; and ii) a chain scission catalyst component dispersed in the polymeric carrier component; wherein a) the chain scission catalyst component includes a chain scission catalyst selected from the group consisting of at least one alkali metal hydroxide, at least one alkaline earth metal hydroxide, and any combination thereof; b) the reactive purge compound further comprises a water generating component; or c) both (a) and (b); wherein the reactive purge compound is a feedstock material in the form of a plurality of pellets, granules, rods, powder or other particles.

This aspect of the invention may be further characterized by one or any combination of the following: the polymeric carrier component is substantially inert to the chain scission catalyst such that the weight average molecular weight of the polymeric carrier component, as measured according to ASTM D5296-05, changes by less than 20% when the reactive purge compound is heated to a temperature about 25° C. above the peak melting temperature of the polymeric component, for a time of about 30 minutes; the reactive purge compound includes the water generating component; the polymeric carrier component includes a polyolefin polymer containing at least about 50 wt % of a first α-olefin based on the total weight of the polyolefin polymer; the polymeric carrier component includes one or more polymers (e.g., at a concentration greater than about 50 wt. %, more preferably greater than about 80 wt. % based on the total weight of the polymer carrier component) having a melt flow rate from about 0.1 to about 80 g/10 min as measured according to ASTM D1238-04; the water generating component includes a water generating compound containing one, two, three, four, or more waters of hydration; the water generating component is selected from magnesium hydroxide, aluminum trihydrate, sodium bicarbonate, potassium bicarbonate, a metal chloride hydrate, a metal sulfate hydrate, a metal nitrate hydrate, a metal silicate hydrate, a metal carbonate hydrate, or any combination thereof; the chain scission catalyst component includes a chain scission catalyst selected from the group consisting of an alkaline-earth metal hydroxide, an alkali metal hydroxide, an alkaline-earth metal carbonate, an alkali metal carbonate, an alkaline-earth metal oxide, an alkali metal oxide, an alkali metal acetate, an alkaline-earth metal acetate, an alkaline-earth metal salt of amino caproic acid, an alkali metal salt of amino caproic acid, a metal salt of linear dimer amino caproic acid, a metal salt of linear trimer caproic acid, and any combination thereof; the chain scission catalyst component includes a chain scission catalyst selected from the group consisting of sodium oxide, potassium oxide, calcium oxide, magnesium oxide, sodium hydroxide, potassium hydroxide, calcium hydroxide, magnesium hydroxide, sodium carbonate, potassium carbonate, magnesium carbonate, sodium acetate, potassium acetate, magnesium acetate, calcium acetate, sodium amino caproate, potassium amino caproate, sodium salt of amino caproate dimer, sodium salt of amino caproate trimer, potassium salt of amino caproate dimer, potassium salt of amino caproate trimer, or any combination thereof; the chain scission catalyst component includes phosphoric acid, boric acid, a salt of phosphoric acid, a salt of boric acid, and any combination thereof; the chain scission catalyst component includes sodium hydroxide, potassium hydroxide, sodium carbonate, potassium carbonate, or any combination thereof; the chain scission catalyst component is present at a concentration from about 0.1 wt. % to about 20 wt. % based on the total weight of the reactive purge compound; the water generating component (if employed) is present from about 0.1 to about 40 wt. % based on the total weight of the reactive purge compound; the water generating compound is dispersed throughout the polymeric carrier component; or the reactive purge compound includes a plurality of first particles including a first portion of the polymeric carrier component and a plurality of second particles including a second portion of the polymeric carrier component and at least a portion of the water generating component, wherein the first particles and the second particles are different.

Another aspect is directed at a process for preparing a reactive purge compound, such as a reactive purge compound described herein, including the step of mixing the water generating component with the polymeric carrier component at a mixing temperature below a predetermined maximum mixing temperature, wherein the water generating compound is generally stable at the maximum mixing temperature.

Another approach for preparing a reactive purge compound, such as a reactive purge compound described herein includes a step of dry blending at a temperature below the onset melting temperature of the polymeric carrier component a plurality of first particles including a first portion of the polymeric carrier component and the chain scission catalyst component, and plurality of particles including a second portion of the polymeric carrier component.

Yet another aspect of the invention is directed at a process for cleaning or purging a polymer processing equipment (or any component thereof, such as a screw, a barrel, or a die), such as an extruder, or a molding machine, using a reactive purge compound (such as one disclosed herein), using a purging process comprising the steps of: a) extruding a first processing resin at a first predetermined processing temperature, wherein the first predetermined processing temperature is greater than about 200° C.; and b) extruding the reactive purge compound at a second predetermined processing temperature, wherein the second predetermined processing temperature is greater than about 200° C.; wherein the second predetermined processing temperature is the same as, or different from the first predetermined processing temperature.

This aspect of the invention may be further characterized by one or any combination of the following: the first processing resin includes a polyamide, a polyester, an EVOH, or any combination thereof; the first processing resin includes a polyamide; the weight average molecular weight of the first processing resin is reduced by 20 to 95%; the second predetermined processing temperature is less than about 290° C.; the process further comprises a step of processing (e.g., extruding) a polyolefin homopolymer or a polyolefin copolymer, such that at least some of the reactive purge compound is removed from the polymer processing equipment; the ratio of the melt flow rate of the first processing resin to the melt flow rate of the reactive purge compound, as measured according to ASTM D1238-04 at 235° C./1.00 kg, is from about 20:1 to about 1:20; or the water generating component generates at least about 0.1 wt. % water based on the total weight of the reactive purge compound.

DETAILED DESCRIPTION

The present invention, in its various aspects, makes use of a unique combination of materials to derive an attractive purge compound, and more particularly a reactive purge compound including a polymeric carrier component, a chain scission catalyst component, and optionally a water generating component. These reactive purge compounds find utility in their ability to purge a polymer processing equipment faster and/or more effectively than an otherwise identical compound without the chain scission catalyst component. As such, the reactive purge compound may be used to purge a polymer processing equipment advantageously resulting in a relatively short purge time (e.g., to transition from a first processing resin to a second processing resin), a relatively short clean-out time, higher quality parts, reduced down time of the polymer processing equipment, reduced weight of scrap, or any combination thereof.

Without being bound by theory, it is believed that the reactive purge compound described herein function at least in part by catalytically reacting with a processing resin (e.g., the first processing resin) in the polymer processing equipment, such that the viscosity of the processing resin is reduced, so that the processing resin can be effectively removed from the processing equipment.

Chain Scission Catalyst Component

One component of the reactive purge compound is a chain scission catalyst component. The chain scission catalyst component includes, consists essentially of, or consists entirely of a chain scission catalyst that increases the rate of viscosity reduction (e.g., the initial rate, such as the average rate during the first 30 seconds after the chain scission catalyst contacts the processing resin) of the processing resin, reduces the temperature at which the viscosity of the processing resin is reduced, or both. The chain scission catalyst component may be a catalyst, such as a catalyst that promotes the reduction in the molecular weight (e.g., reduction in the chain length, or the radius of gyration) of the processing resin.

Suitable chains scission catalysts include inorganic compounds and organometallic compounds. The chains scission catalysts may include or consist essentially of one or any combination of the following compounds: alkaline-earth metal hydroxides, alkali metal hydroxides, alkaline-earth metal carbonates, alkali metal carbonates, alkaline-earth metal oxides, alkali metal oxides, alkali metal acetates, alkaline-earth metal acetates, alkaline-earth metal salts of amino caproic acid, alkali metal salts of amino caproic acid, metal salts of linear dimer amino caproic acid, and metal salts of linear trimer caproic acid. Other chain scission catalysts that may be employed include acids, such as phosphoric acid, boric acid, a salt of phosphoric acid, a salt of boric acid, or any combination thereof.

Without limitation, exemplary chain scission catalysts that may be used in the reactive purge compound include sodium oxide, potassium oxide, calcium oxide, magnesium oxide, sodium hydroxide, potassium hydroxide, calcium hydroxide, magnesium hydroxide, sodium carbonate, potassium carbonate, magnesium carbonate, sodium acetate, potassium acetate, magnesium acetate, calcium acetate, sodium amino caproate, potassium amino caproate, sodium salt of amino caproate dimer, sodium salt of amino caproate trimer, potassium salt of amino caproate dimer, potassium salt of amino caproate trimer, or any combination thereof. Particularly preferred chain scission catalysts include sodium hydroxide, potassium hydroxide, sodium carbonate, potassium carbonate, or any combination thereof.

Surprisingly, certain of the chain scission catalysts of the present teachings do not require a water generating compound to reduce the viscosity of the processing resin. As such, certain of the chain scission catalysts may be used in a reactive purge compound that either further comprises a water generating compound or is free of a water generating compound (e.g., free of a water generating compound other than the chain scission catalyst). Without limitation, exemplary chain scission catalysts that may be used either with or without a water generating component include alkali metal hydroxides (e.g., sodium hydroxide and potassium hydroxide) and alkaline earth metal hydroxides (e.g., calcium hydroxide and magnesium hydroxide).

The chain scission catalyst component may be dry (e.g., substantially free or entirely free of water) or may contain water. For example, at least some of the chain scission catalyst may include compounds having one, two, three, or more waters of hydration. Preferably the chain scission catalyst is a solid.

The chain scission catalyst component may be present at a concentration sufficient to catalyze the viscosity reduction of the processing resin. For example, the chain scission catalyst component may be present in the reactive purge compound at a concentration greater than about 0.1 wt. %, preferably greater than about 0.2 wt. %, more preferably at a concentration greater than about 0.4 wt. %, and most preferably at a concentration greater than about 0.8 wt. % based on the total weight of the reactive purge compound. The chain scission catalyst component may be present in at a concentration less than 20 wt. %, preferably less than about 15 wt. %, more preferably less than about 10 wt. %, and most preferably less than about 5 wt. % (e.g., even less than about 2 wt. %) based on the total weight of the reactive purge compound. For example, the chain scission catalyst may be present at a concentration from about 0.4 wt. % to about 5 wt. % based on the total weight of the reactive purge compound.

Polymeric Carrier Component

The polymeric carrier component provides a polymer matrix in which one or more, or even all of the other components of the reactive purge compound is dispersed. For example, the reactive purge compound may include particles (e.g., pellets, granules, rods, powders, or other particles) each containing a mixture of the polymeric carrier component, the chain scission catalyst component and if employed, the water generating component.

In one more particular aspect of the invention, the reactive purge compound may include a blend (e.g., a dry blend) of two, three, or more different particles (e.g., pellets, granules, rods, powders, or other particles) having different compositions. For example, the reactive purge compound may include a plurality of first particles each containing a first portion of the polymeric carrier component and containing at least a portion of the chain scission catalyst component, at least a portion of the water generating component, or both, and a plurality of second particles containing a second portion of the polymeric carrier component containing different ingredients than the first particles (e.g., a different portion of the water generating component, a chain scission catalyst component not in the first particles, and the like). According to the teachings herein, the polymeric carrier component includes the first portion of the polymeric carrier component, the second portion of the polymeric carrier component, and any additional (e.g., a third, or fourth) portion of the polymeric carrier component that may be present. In this aspect of the invention, the first and second portions of the polymeric component may be of the same polymers (so that the difference in the first particles and the second particles may be in the ingredients other than the polymers) or the first and second portions of the polymeric carrier component may employ different polymers (e.g., polymers having different melting temperatures, different melt flow rates, or both).

The polymeric carrier component may include, consists substantially of, or consist entirely of one or more polymers. Preferably, the polymeric carrier component includes one or more thermoplastics, such as a thermoplastic having a peak melting temperature or a glass transition temperature greater than about 50° C., preferably greater than 80° C., and more preferably greater than about 100° C. (e.g., as measured according to ASTM D3418-97). The polymer may have a glass transition temperature, a peak melting temperature, or both, that is less than about 260° C., preferably less than about 200° C., and more preferably less than about 180° C.

The one or more polymers of the polymeric carrier component preferably do not significantly react with water in the presence of the chain scission catalyst at typical processing temperatures (e.g., at a temperature of about 250° C.), such that the viscosity of the polymeric carrier component changes by less than about 20% (preferably less than about 10%) during a purging process. Without limitation, suitable polymers for use in the polymeric component include olefin containing polymers and styrene containing polymers. For example the polymeric carrier component (e.g., the first polymeric carrier component) may include, consist essentially of, or consist entirely of one or more polyolefin polymers, such as one or more polyolefin homopolymers (e.g., polyethylene homopolymers, polypropylene homopolymers, or both), one or more copolymers including at least 50 wt. % (preferably at least 60%) of a first α-olefin (e.g., ethylene or propylene) based on the total weight of the polyolefin polymer, or any combination thereof.

Without limitation, exemplary styrene-containing polymers and α-olefin containing polymers that may be employed in the polymer carrier component include polyethylenes, such as polyethylene homopolymers; polyethylene copolymers including at least one additional α-olefin such as propylene, 1-butene, 1-hexene, 1-octene, 1-decene, or any combination thereof (e.g., high density polyethylene, medium density polyethylene, low density polyethylene, linear low density polyethylene, very low density polyethylene, and ultralow density polyethylene); copolymers of ethylene with a second monomer selected from the group consisting of vinyl acetate, an acrylate ester, styrene, 4-methyle-1-pentene, and any combination thereof (e.g., ethylene vinyl acetate copolymer, ethylene butyl acrylate copolymer, ethylene methyl acrylate copolymer, and ethylene styrene copolymer); polypropylene homopolymers; polypropylene copolymer include at least one additional monomer selected from the group consisting of ethylene, 1-butene, 1-hexene-1-octene, 1-decene, 4-methyl-1-pentene, and any combination thereof (such as isotactic polypropylene, syndiotactic polypropylene, impact polypropylene, and random polyprolyene); poly-1-butene; poly-4-methyl-1-pentene; styrene containing polymers including polystyrene homopolymer, impact modified polystyrene, polystyrene random copolymers, polystyrene block copolymers (such as styrene-butadiene copolymers, acrylonitrile-butadiene-styrene block copolymers, styrene-butadiene-styrene block copolymers, styrene-isoprene-styrene block copolymers, and partially or fully hydrogenated analogues of any of the above); or any combination thereof. Copolymers (e.g., random copolymers or graft copolymers) of any of the above polymers with an unsaturated carboxylic acid, an acid anhydride of an unsaturated carboxylic acid, a vinylsilane compound, an epoxide, or any combination thereof, may also be employed. The polymeric carrier component preferably includes, consists substantially of, or even consists entirely of a high density polyethylene, low density polyethylene, linear low density polyethylene, isotactic polypropylene, random polypropylene copolymer (e.g., including ethylene), and impact polypropylene, or any combination thereof, and more preferably includes, consists substantially of, or even consists entirely of low density polyethylene.

The polymeric carrier component (e.g., the first portion of the polymeric carrier component), the reactive purge compound, or both may have a melt flow rate (measured according to ASTM D1238-04 at 190° C./2.16 kg) greater than about 0.1 g/10 min, preferably greater than about 0.5 g/10 min, more preferably greater than about 1 g/10 min, and most preferably greater than about 3 g/10 min. Materials having a lower melt flow rate may be difficult to remove from the polymer processing equipment and/or difficult to process. The polymeric carrier component (e.g., the first portion of the polymeric carrier component), the reactive purge compound or both may have a melt flow rate (measured according to ASTM D1238-04 at 190° C./2.16 kg) preferably less than about 80 g/10 min, more preferably less than about 60 g/10 min, and most preferably less than about 50 g/10 min. Materials having a higher melt flow rate may be inefficient in removing the processing resin from the polymer processing equipment.

The total concentration of the one or more thermoplastics (e.g., the total concentration of the polyolefin, of the polyethylene, or of the low density polyethylene) in the polymeric carrier component, in the reactive purge compound, or both, preferably is greater than about 20 wt. %, more preferably greater than about 40 wt. %, and most preferably greater than about 60 wt. % (e.g., greater than about 90 wt. %, or even about 100 wt. %).

The total concentration of the polymeric carrier component in the reactive purge compound may be greater than about 20 wt. %, preferably greater than about 40 wt. %, more preferably greater than about 50 wt. %, and most preferably greater than about 60 wt. % (e.g. greater than about 80 wt. %, or even greater than about 90 wt. %) based on the total weight of the reactive purge compound.

In one aspect of the invention, the polymeric carrier component may include a first portion of the polymeric component that is used for carrying a first portion of the water generating compound and a second portion of the polymeric component that is used carrying a second portion of the water generating component, so that the first and second portions of the water generating component are not in contact in the reactive purge compound. Once introduced into the polymer processing equipment (e.g., the equipment being purged), the heat and/or the shear of the equipment may allow the two portions of the water generating component to contact each other and generate water. In this aspect of the invention, the first and second portions of the polymeric components may have the same peak melting temperature, or they may have peak melting temperatures that are different.

Water Generating Component

As taught herein, certain chain scission catalysts may be only effective or may be more effective (i.e., the rate of and/or the extent of chain scission is increased) in the presence of water, and thus the reactive purge compound may advantageously include a water generating component that includes one or more compounds that releases water. The water generating component is optional when employing certain chain scission catalysts and is required when only employing other chain scission catalysts. Preferably the reactive purge compound includes the water generating component.

As used herein, the water generating component may be a single compound, or may include a plurality of compounds. For example, the water generating component may include one or more compounds that are hygroscopic; one, two or more compounds that react (e.g., at an elevated temperature and/or upon being contacted) to form water; one or more compounds that otherwise carries unbound water (such as a microfibrill at least partially filled with water); or any combination thereof. Hygroscopic compounds that may be employed in the reactive purge compound include compounds that include bound water, and preferably contain at least about 5 wt. % bound water. Exemplary hygroscopic compounds include compounds wherein at least some of the molecules contain one-half, one, two, three, four, or more waters of hydration.

Without limitation, water generating compounds that may be employed include magnesium hydroxide, aluminum trihydrate, sodium bicarbonate, potassium bicarbonate, a metal chloride hydrate, a metal sulfate hydrate, a metal nitrate hydrate, a metal silicate hydrate, a metal carbonate hydrate, or any combination thereof. Preferred water generating compounds that may be employed include magnesium hydroxide, aluminum trihydrate, sodium bicarbonate, potassium bicarbonate, calcium chloride hydrates ($CaCl_2 \cdot nH_2O$, e.g., n=1, 2, 4, 6), barium chloride hydrate ($BaCl_2 \cdot H_2O$), sodium sulfate decahydrate ($Na_2SO_4 \cdot nH_2O$), magnesium sulfate hydrates ($MgSO_4 \cdot nH_2O$, e.g., n=1, 6, 7, 12), manganese sulfate hydrates ($MnSO_4 \cdot nH_2O$, e.g., n=1, 4, 5, 7), calcium sulfate hydrates ($CaSO_4 \cdot nH_2O$, e.g., n=0.5, 2), aluminum sulfate hydrates ($Al_2(SO_4)_3 \cdot nH_2O$, e.g., n=6, 10, 16, 18, 27), aluminum ammonium sulfate hydrate (($NH_4$)$Al(SO_4)_2 \cdot H_2O$), aluminum potassium sulfate hydrates ($KAl(SO_4)_2 \cdot nH_2O$, e.g., n=6, 8, 12), magnesium nitrate hydrates ($Mg(NO_3)_2 \cdot nH_2O$, e.g., n=2, 6), aluminum nitrate hydrates ($Al(NO_3)_3 \cdot nH_2O$, e.g., n=6, 8, 9), calcium nitrate tetrahydrate ($Ca(NO_3)_2 \cdot H_2O$), sodium silicate hydrate ($Na_2SiO_3 \cdot nH_2O$, e.g., n=5, 6, 8, 9), sodium carbonate hydrates ($Na_2CO_3 \cdot nH_2O$, e.g., n=1, 7, 10), magnesium carbonate hydrates ($MgCO_3 \cdot nH_2O$, e.g., n=1, 3, 5), or any combination thereof.

When heated (e.g., to a temperature at which the water generating compound releases its bound water) the water generating component preferably releases at least about 5 wt. % water, more preferably at least about 20 wt. % water, and most preferably at least about 40 wt. % water, based on the total weight of the water generating component.

If employed, the water generating compound may be present in the reactive purge compound at a concentration greater than about 0.1 wt. %, preferably greater than about 0.2 wt. %, more preferably greater than about 0.4 wt. %, and most preferably greater than about 1.0 wt. %, based on the total weight of the reactive purge compound. If employed, the water generating compound may be present in the reactive purge compound at a concentration less than about 40 wt. %, preferably less than about 20 wt. %, and more preferably less than about 15 wt. %, and most preferably less than about 10 wt. %, based on the total weight of the reactive purge compound.

If employed, the water generating compound may generate at least about 0.005 wt. % water, preferably at least about 0.010 wt. % water, more preferably at least about 0.02 wt. % water, and most preferably, at least about 0.1 wt. % water, based on the total weight of the reactive purge compound. If employed, the water generating compound will typically generate less than about 10 wt. % water, more typically less than about 5 wt. % water, and most typically less than about 2 wt. % water, based on the total weight of the reactive purge compound.

The water generating component may be dispersed within the polymeric carrier component, the water generating component may be dispersed in a second portion of the polymeric carrier component, or separate portions of the water generating component may be provided in two, three or more different portions of the polymeric carrier component.

The total concentration of the one or more chain scission catalysts, the one or more polymers of the polymeric carrier component, and the optional one or more water generating compounds may be greater than about 40 wt. %, preferably greater than about 70 wt. %, more preferably greater than about 85 wt. %, even more preferably greater than about 90 wt. %, and most preferably greater than 95 wt. % (e.g., greater than about 98 wt. %) based on the total weight of the reactive purge compound.

Optional Additional Ingredients

The reactive purge compounds according to the teachings herein may further include one or more fillers and/or other art known additives, such as heat stabilizers, processing aids, antiblocking agents, antistatic agents, coupling agents, antioxidants, lubricants, pigments, foaming agents, surfactants, plasticizers and the like, each in an amount which will not adversely affect the effects of the present invention For example, the reactive purge compounds according to the teachings herein may further include one or more additional additives that are known in the art to promote the purging of polymer processing equipment (including but not limited to abrasive inorganic powders or other abrasive inorganic materials such as silica, titanium dioxide, calcium carbonate, and mixtures thereof, foaming agents, surfactants, plasticizers, or any combination thereof). In one aspect of the invention, the reactive purge compound advantageously includes one, two, three or more additives selected from the group consisting of abrasive inorganic materials, foaming agents, surfactants, and plasticizers.

The reactive purge compound preferably is stable in that the polymeric carrier component of the reactive purge compound does not substantially react with the chain scission catalyst component or other ingredients of the reactive purge compound during typical processing conditions. For example, the weight average molecular weight (e.g., as measured according to ASTM D5296-05) of the polymers of the polymeric carrier component (e.g., of the first polymeric carrier component) preferably changes (i.e., increases or decreases) by less than about 20%, more preferably less than about 10 wt. %, and most preferably less than about 5 wt. %, when the reactive purge compound is heated to a temperature about 25° C. above the peak melting temperature of the polymeric carrier component for a time of about 30 minutes, compared with the weight average molecular weight of the polymer(s) prior to the heat treatment.

Process for Preparing the Reactive Purge Compound

The reactive purge compound may be prepared by mixing the polymeric carrier component, the chain scission catalyst component and, if employed, the water generating component, to obtain an admixture (e.g., a generally homogeneous admixture). As such, the components may be mixed using polymer processing equipment that provides heat, shear, or both, such as an internal mixer, an single screw extruder, a twin screw extruder, a mill, and the like, known in the field of polymer compounding. The reactive purge compound, after homogenizing, may be extruded and pelletized or otherwise cut into particles (e.g., pellets, granules, rods, powders, or other particles).

The process for preparing the reactive purge compound may also include one or any combination of the following: a step of dry blending two or more of the ingredients, a step of spraying one ingredient with a second ingredient, a step of drying one or more of the ingredients, or a step of dry blending a diluent polymeric material that is free of the chain scission catalyst component and the water generating component.

If the water generating component is employed, the reactive purge compound preferably is prepared by mixing the polymeric carrier component, the chain scission catalyst component and the water generating component at a predetermined maximum mixing temperature (e.g., above the peak melting temperature, preferably at least 20° C. above the peak melting temperature of the polymeric carrier component), wherein the water generating compound is generally stable (e.g., does not release water) at the predetermined maximum mixing temperature.

Reactive purge compounds may also be prepared using a process that results in a blend (e.g., a dry blend) of two or more types of particles. For example, the process for preparing the reactive purge compound may include a step of blending (e.g., dry blending) at a temperature below the onset melting temperature of the polymeric carrier component a plurality of first particles including a first portion of the polymeric carrier component and the chain scission catalyst component, and a plurality of particles including a second portion of the polymeric carrier component.

Use of the Reactive Purge Compound

The reactive purge compounds according to the teachings herein may be employed in a purging process (e.g., a cleaning process) that includes a step of melt processing a first processing resin, and a step of melt processing the reactive purge compound, and optionally a step of melt processing a second processing resin that may be the same as or different from the first processing resin, where the melt processing steps include processing through at least one same portion of a polymer processing equipment, such that the polymer processing equipment (e.g., the at least one same portion of the polymer processing equipment) is at least partially cleaned.

The purging or cleaning process may also include an optional prepurge flushing step (e.g., prior to the step of melt processing the reactive purge compound) of melt processing a first transitional polymeric material, an optional postpurge flushing step (e.g., after the step of melt processing the reactive purge compound) of melt processing a second transitional polymeric material, or both. For example, the purging process may include a step of introducing a polymeric material that includes one or more of the components of the purge material (such as a polyolefin, a water generating component, or both), but does not include other components (such as the chain scission catalyst component).

The reactive purge compound may be used in a purging process that purges polymer processing equipment, such as equipment that compounds polymeric materials (e.g., a mixer, a single screw extruder, a twin screw extruder, a kneader, or a mill), equipment (e.g., an extruder, a mill, an injection molding machine, a blow molding machine, a co-injection molding machine, and the like) that shapes or otherwise forms polymeric materials. Without limitation, the purging process may be used to clean polymer processing equipment that shapes a preform, shapes a finished part, shapes a pellet, forms or extrudes a parison, shapes an intermediate structure, shapes a profile, shapes a fiber, provides at least one feedstream into a multi-component object, or any combination thereof. For example, the purging process may be used to clean one, two or more (e.g., all) of the extruders employed in forming a coextruded or coinjection molded part, such as a multi-layered film. The reactive purge compound may be used in a purging process for purging a continuous process or a batch process.

The reactive purge compound may be used for transitioning between different materials (e.g., between different processing resins), to clean a processing equipment, to prevent buildup of material in a processing equipment, or any combination thereof. For example, the reactive purge compound may be used for transitioning between two processing resins which are chemically different, or between two different grades of processing resins that are chemically the same. The purging process may be used to clean at least a portion of the processing equipment (e.g., a die, a screw, a barrel, a nozzle, a roll, a mixing blade, a tube such as a adapter or other transition tube, or any combination thereof) to remove contamination, to remove degraded material, to remove material adhered to the processing equipment, to remove gelled material, or any combination thereof. The purging process may be used to prevent buildup of material in a processing equipment and thereby prevent the material from degrading, gelling, or otherwise forming a contaminant. The reactive purge compound may also be used to reduce the viscosity of a processing resin being processed such that it is more easily removed from the processing equipment (so that a second processing resin having a lower viscosity than the first processing resin may be processed, e.g., with a shorter transition time).

In one particularly attractive process, the reactive purge compound is added to a polymer extruder after extruding a first processing resin (e.g., a first polyamide, such as a nylon 6, a nylon 6,6, a nylon 12 and the like) and prior to extruding a second polymer (e.g., a second polyamide, which may be the same or different from the first polymer).

The reactive purge compound may be used for purging a polymer containing resin (e.g., a first processing resin) that includes, consists substantially of, or even consists entirely of one or more polyamides, one or more polyesters, one or more ethylene vinyl alcohol copolymer (EVOH), or any combination thereof. As such, the reactive purge compound may be used in a process where the first processing resin includes a polyamide, a polyester, an ethylene vinyl alcohol copolymer (EVOH), or any combination thereof. Most preferably, the first processing resin includes a polyamide (for example nylon 6, nylon 6,6, nylon 12, or any combination thereof). As such, the purging process may include a step of using the reactive purge compound to purge any of the forementioned resins (e.g., a resin including a polyamide, a polyester, an ethylene vinyle alcohol copolymer, or any combination thereof).

The reactive purge compound may be used to reduce the viscosity, reduce the weight average molecular weight, and/or increase the melt flow rate of a first processing resin that is in a polymer processing equipment, such that the first processing resin may be removed.

The relative melt viscosity change (e.g., measured using a Brabender Plasticorder, as described later, herein) of the first processing resin (e.g., a polyamide) may be at least about 20%, more preferably at least about 35%, and most preferably at least about 50%. The relative melt viscosity change is preferably less than about 95%. However, higher values are also anticipated.

The purging process according to the teachings herein may include a step of purging the polymer processing equipment with one or more additional polymeric material. As such, the process may include a step of diluting the reactive purge compounds with one or more additional polymeric material.

The reactive purge compound may be used for purging a polymer processing equipment having a screw and barrel assembly. Such a purging process may include a single purging temperature or the process may include one, two or more steps of changing the purging temperature (e.g., changing a set temperature on the extruder). The process may include a single screw speed, or the process may include one, two, three, or more steps of changing (increasing, decreasing, or both) the screw speed, including one or more optional steps of switching the screw speed to idle or stop the screw. For example, the purging process may include a process similar to the one described in "The Disco Purging Procedure for Extrusion Coaters", DuPont Chemical Company, at www.dupont-.com/packaging/products/nucrel/pdsprint/purge.html as accessed on Sep. 10, 2005, incorporated herein by reference, (such as one that employs three or more, five or more, or even seven or more steps of changing the screw speed about once every 30 seconds to 10 minutes, so that the screw speed varies by at least a factor of about 2, preferably at least a factor of about 4 during the process).

The purging process preferably includes a step of removing at least some of the first processing resin by processing a transitional polymeric material, a step of removing at least some of the reactive purge compound by processing a transitional polymeric material in the equipment, or both. Suitable transitional polymeric materials preferably include or consist essentially of one or more polymers that are not reactive with the reactive purge compound. The transitional polymeric material(s) may be essentially free of polymers that react with the reactive purge compound. Without limitation, the transitional polymeric material may include or consist essentially of one or any combinations of the polymers that are suitable for the carrier resin, as described above. Most preferably a transitional polymeric material is employed between a step of processing the reactive purge compound and a step of shutting down the equipment (e.g., for a period of time greater than about 15 minutes or even greater than about 60 minutes or more), a step of processing a second processing resin, or a second step of processing the first processing resin. For example, the second processing resin may first be processed after the transitional polymeric material has removed some (e.g., at least about 80%, preferably at least about 90%, and most preferably at least about 99%) of the reactive purge compound.

Test Methods

Unless otherwise specified, the peak melting temperature, the end melting temperature, the onset melting temperature, the peak crystallization temperature, the onset crystallization temperature, the end crystallization temperature, the glass transition temperature, the onset temperature of the glass transition, and the end temperature of the glass transition are measured according to ASTM D3418-97, and expressed in units of ° C.

Unless otherwise specified, the melt flow rate is measured according to ASTM D1238-04. Unless otherwise specified, the following temperature and loads are used for measuring the melt flow rates of the following polymers:

| Polymer | Test Temperature, ° C. | Load (kg) |
| --- | --- | --- |
| Polyethylenes | 190 | 2.16 |
| Polypropylenes | 230 | 2.16 |
| Polyamide 66 | 275 | 0.325 |
| Polyamide 6 | 235 | 1.0 |

In testing mixtures of polymers or in comparing different polymers the higher test temperature is used (along with the corresponding load), and if the test temperatures are the same, the higher load is employed.

The relative melt viscosity change of a polymeric material (e.g., of the first processing resin) to an additive or additive package is measured using a Brabender Plasticorder having a half-size mixer head with a net capacity of 30 cm$^3$. The Brabender is heated to a temperature of 240° C. and the mixing speed is set to 40 rpm. The Brabender is filled with the polymeric material to a fill factor of about 70% and the initial torque is measured. Next, the additive package (e.g., the chain scission catalyst) is added at a concentration of 1 wt. %, based on the total weight, and the mixing is continued for 30 minutes. The relative melt viscosity change is defined by:

$$100\% \times [Torque(f) - Torque(i)] / Torque(i) \quad \text{(Equation 1)}$$

where Torque(i) is the initial Brabender torque (in units of Nm) of the first processing resin before adding a chain scission catalyst and Torque(f) is the Brabender torque 30 minutes after the addition of a chain scission catalyst. The test is performed using a nitrogen purge.

The relative stability of a reactive purge compound may be measured using the same method as used for measuring the relative melt viscosity change of a polymeric material, except only the reactive purge compound is added to the Brabender Plasticorder.

EXAMPLES

Example 1

A purge compound is prepared by first spraying a solution of sodium hydroxide in water onto pellets of a low density polyethylene (Petrothene® NA960000 commercially available from Equistar Chemicals and having a melt flow rate of about 0.8 g/10 min as measured according to ASTM D1238-04 at 190° C./2.16 kg) such that upon drying the coated pellets, the ratio of the low density polyethylene to the sodium hydroxide is about 99:1. The low density polyethylene (LDPE) is dried at about 100° C. for about 16 hours to remove the water before extruding. The coated pellets containing the LDPE and the sodium hydroxide is melt compounded on a Killion single screw extruder having a screw diameter of about 31.75 mm and a length to diameter ratio (L/D) of about 24:1. The extruder is fitted with a barrel extension (304.8 mm long) which accommodates a chopper section of the screw (such as one disclosed in U.S. Pat. No. 6,062,717, incorporated herein by reference) and enhances mixing and dispersion. Including the barrel extension, the L/D ratio is about 33.5:1. The processing conditions for the extruder includes a feed zone temperature of about 193° C., a compression zone temperature of about 204° C., a metering zone temperature of about 213° C., a chopper section temperature of about 221° C., and a die temperature of about 221° C. The purge compound is extruded as a strand, pelletized and dried.

The performance of the purge compound is evaluated on a Killion single screw extruder having an L/D of about 24:1 and having an adapter and a flat film die (die width=75 mm) which are dismantled and physically cleaned by hand. After cleaning, the extruder and die are reassembled and heated to the following temperature settings: Feed zone=210 C, Compression zone=249 C, Metering zone=249 C, Die=249 C. Nylon 6, H135QP from Honeywell, containing 5% of a black color masterbatch (S-801538 from RTP Company) is extruded into a monolayer film, having a width of about 25-28 mm, using a screw speed of about 100 rpm for about 10 minutes. Then a fixed amount (about 2.0 kg) of the purge compound is melt processed through the extruder. The purging time is about 30 minutes, but may vary. Next about 200 grams of neat LDPE polymer is melt processed through the extruder using the same condition to remove the purge material from the extruder. Throughout the process of extruding the nylon and the purge compound, samples of the film are collected for evaluating the time to remove the black color from the film and comparing the purging efficiency. After extruding the neat LDPE, the die and adapter are disassembled and the screw is removed from the barrel for examination of black residue left on the screw.

Purge Rating

The following criteria are used for rating the purging effectiveness of the purge compounds:

5—There is no visible black residue left on the screw and it takes less than 20 minutes to visibly clear the black color in the film. The purge compound is deemed acceptable.

4—There is a very small amount of black residue visibly left on the screw and it takes less than 20 minutes to visibly clear the black color in the film. The purge compound is still deemed generally acceptable.

3—There is a fair amount of black residue visibly left on the screw and it takes less than 20 minutes to visibly clear the black color in the film.

2—There is a fair amount of black residue visibly left on the screw and it takes more than 20 minutes to visibly clear the black color in the film.

1—There is a significant amount of black visibly remaining on the screw and the film is never visibly clear of black color after 30 minutes of purge.

Example 2

Example 2 is prepared and evaluated using the same materials and process as described for Example 1, except about 1 wt. % KOH is used instead of 1 wt. % NaOH, as the chain scission catalyst.

Example 3

Example 3 includes a first portion of the purge compound prepared and evaluated using the same materials and process as described for Example 1, except 1 wt. % of anhydrous potassium carbonate ($K_2CO_3$) from Fisher Scientific. Example 3 is prepared by then dry blending the first portion of the purge compound with Polyfil SBC-4000 (a concentrate of sodium bicarbonate in a polyolefin carrier resin including a thermoplastic), at a ratio of about 97 wt. % to about 3 wt. %. The concentration of sodium bicarbonate in Example 3 is about 1.2 wt. % based on the total weight of the purge compound.

Example 4

Example 4 is prepared using the same materials and process as described for Example 3, except the concentration of the sodium bicarbonate is reduced to about 0.6 wt. % based on the total weight of the purge compound.

Example 5

Example 5 is prepared using the same materials and process as described in Example 1 except the purge compound includes about 96 wt. % of the LDPE, about 3 wt. % of $Al(OH)_3$ and about 1 wt. % $K_2CO_3$. The aluminum trihydrate that is used in example 5 is SB-432, commercially available from Akrochem Corporation. SB-432 has a median particle size of about 9 μm, a surface area of about 2.0 m²/g, and a purity of greater than about 98%.

Comparative Example 1

Comparative Example 1 is prepared using the same materials and process as described in Example 2, except only 1 wt. % of CaCO₃ (calcium carbonate) is used, without any KOH. The calcium carbonate used in Comparative Example 1 is Vicron® 15-15 ground calcium carbonate, commercially available from Specialty Minerals Inc. VICRONO® 15-15 has an average particle size of about 3.5 microns, and contains less than 0.1 wt. % (e.g., about 0.004 wt. %) of particles greater than 325 mesh. The purity of Vicron® 15-15 is about 97 wt. %.

Comparative Example 2

Comparative Example 2 includes only the neat LDPE resin that is used in the purge compound of Example 2 (i.e., Comparative Example 2 is free of the KOH or any other chain scission catalyst).

Comparative Example 3

Comparative Example 3 is the same as Comparative Example 2 except a neat polypropylene (PP) resin is used (i.e., without any chain scission catalyst). The PP used in Comparative Example 3 is a homopolymer polypropylene having a melt flow rate of about 2.0 g/10 min (as measured according to ASTM D1238 at 230° C./2.16 kg), a density of about 0.905 (as measured according to ASTM D-1505), and a peak melting temperature of about 163° C. (as measured using differential scanning calorimetry) and is commercially available from Total Petrochemicals USA, Inc. under the grade name Polypropylene 3276.

Examples 1-5 and Comparative Examples 1-3 are all tested using the protocol described in Example 1, to determine the purging efficiency. The composition and purge rating for these Examples are given in Table 1 and the compositions and purge rating of the Comparative Examples are given in TABLE 2.

The purge ratings from these examples and comparative examples indicate that reactive purge compounds including a chain scission catalyst (such as sodium hydroxide or potassium hydroxide) or a mixture of a chain scission catalyst (such as potassium carbonate, e.g., at a concentration greater than about 1 wt. % potassium carbonate) and a water generating compound (such as sodium bicarbonate or aluminum trihydrate), in a polyolefin carrier (e.g., including at least 80 wt. % of a polyethylene such as a low density polyethylene), can be used for purging polyamides (such as nylon 6, nylon 6,6, nylon 12, or any combination thereof).

Similar results are expected for other polyolefins used in the purge compound and for other polyamides used in the processing resin. Similar results are also expected where the polymers include other ingredients. Similar results are also expected when varying the concentration of the chain scission catalyst, the water generating compound (if employed), or both (e.g., from about 0.1 to about 20 times the stated value).

Comparative Example 4

A sample of nylon 6 is placed in a Brabender Plasticorder. The temperature of the mixer is 240° C. and the mixing speed is 40 rpm. The initial torque of the mixer rotors is about 4.45 Nm. After about 15 minutes, the torque increases only slightly to about 4.55 Nm. After about 30 minutes, the torque decreases only slightly to about 4.35 Nm.

TABLE 1

Purging Material Compositions and Purge Ratings of Examples 1-5

| Composition | Example No. | | | | |
|---|---|---|---|---|---|
| | 1 | 2 | 3 | 4 | 5 |
| LDPE, wt. % | 99 | 99 | 96 | 97.5 | 96 |
| NaOH, wt. % | 1 | | | | |
| KOH, wt. % | | 1 | | | |
| K₂CO₃, wt. % | | | 1 | 1 | 1 |
| Sodium bicarbonate, wt. % | | | 1.2 | 0.6 | |
| Polymeric carrier for sodium bicarbonate, wt. % | | | 1.8 | 0.9 | |
| Al(OH)₃, wt. % | | | | | 3 |
| Purge Rating | 5 | 5 | 5 | 5 | 4 |

TABLE 2

Compositions and Purge Ratings of Comparative Examples 1-3

| Composition | Comparative Example | | |
|---|---|---|---|
| | 1 | 2 | 3 |
| LDPE, wt. % | 99 | 100 | |
| Polypropylene, wt. % | | | 100 |
| CaCO₃, wt. % | 1 | | |
| Purge Rating | 2 | 1 | 1 |

Example 6

Example 6 is performed using the same procedure as Comparative Example 4, except 1 wt. % K₂CO₃ is added to the nylon 6. The initial torque of the mixer rotors is about 4.2 Nm. After about 15 minutes, the torque decreases to about 2.35 Nm (a reduction of about 44%). After about 30 minutes, the torque further decreases to about 1.7 Nm (a total reduction of about 60%).

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A reactive purge composition for cleaning polymer processing equipment wherein the reactive purge composition comprises:
   i) greater than 50 wt. % of a polymeric carrier component based on the total weight of the reactive purge composition; wherein the polymeric carrier component includes one or more polymers;
   ii) at least about 0.1 wt. % of a chain scission catalyst component, based on the total weight of the reactive purge composition, wherein the chain scission catalyst is dispersed in the polymeric carrier component; and
   iii) a water generating component including aluminum trihydrate, sodium bicarbonate, potassium bicarbonate, a metal chloride hydrate, a metal sulfate hydrate, a metal nitrate hydrate, a metal silicate hydrate, a metal carbonate hydrate, or any combination thereof;
wherein the reactive purge composition is a feedstock material in the form of a plurality of pellets, granules, rods, powder or other particles.

2. The reactive purge composition of claim 1, wherein the polymeric carrier component is substantially inert to the chain scission catalyst such that the weight average molecular weight (as measured according to ASTM D5296-05) of the polymeric carrier component, changes by less than about 20% when the reactive purge composition is heated to a temperature about 25° C. above the peak melting temperature of the polymeric carrier component, for a time of about 30 minutes.

3. The reactive purge composition of claim 1, wherein the chain scission catalyst component includes a chain scission catalyst selected from the group consisting of at least one alkali metal hydroxide, at least one alkaline earth metal hydroxide, and any combination thereof.

4. The reactive purge composition of claim 1, wherein the polymeric carrier component includes a polyolefin polymer containing at least about 50 wt % of a first α-olefin based on the total weight of the polyolefin polymer.

5. The reactive purge composition of claim 4, wherein the polymeric carrier component includes a polymer having a melt flow rate from about 0.1 to about 80 g/10 min as measured according to ASTM D1238-04.

6. The reactive purge composition of claim 4, wherein the water generating component includes a water generating component containing one, or more waters of hydration.

7. The reactive purge composition of claim 4, wherein the water generating component is aluminum trihydrate, sodium bicarbonate, potassium bicarbonate, a metal chloride hydrate, a metal sulfate hydrate, a metal nitrate hydrate, or any combination thereof.

8. The reactive purge composition of claim 4, wherein the chain scission catalyst component includes a chain scission catalyst selected from the group consisting of an alkaline-earth metal hydroxide, an alkali metal hydroxide, an alkaline-earth metal carbonate, an alkali metal carbonate, an alkaline-earth metal oxide consisting of calcium oxide, an alkali metal oxide, an alkali metal acetate, an alkaline-earth metal acetate, an alkaline-earth metal salt of amino caproic acid, an alkali metal salt of amino caproic acid, a metal salt of linear dimer amino caproic acid, a metal salt of linear trimer caproic acid, and any combination thereof.

9. The reactive purge composition of claim 4, wherein the chain scission catalyst component includes a chain scission catalyst selected from the group consisting of sodium oxide, potassium oxide, calcium oxide, sodium hydroxide, potassium hydroxide, calcium hydroxide, magnesium hydroxide, sodium carbonate, potassium carbonate, magnesium carbonate, sodium acetate, potassium acetate, magnesium acetate, calcium acetate, sodium amino caproate, potassium amino caproate, sodium salt of amino caproate dimer, sodium salt of amino caproate trimer, potassium salt of amino caproate dimer, potassium salt of amino caproate trimer, and any combination thereof.

10. The reactive purge composition of claim 4, wherein the chain scission catalyst component includes sodium hydroxide, potassium hydroxide, sodium carbonate, potassium carbonate, or any combination thereof.

11. A reactive purge composition for cleaning polymer processing equipment wherein the reactive purge composition-comprises:
  i) greater than 50 wt. % of a polymeric carrier component based on the total weight of the reactive purge composition; wherein the polymeric carrier component includes one or more polymers;
  ii) a chain scission catalyst component dispersed in the polymeric carrier component; and
  iii) a water generating component having one, or more waters of hydration; or
  wherein the reactive purge composition is a feedstock material in the form of a plurality of pellets, granules, rods, powder or other particles;
  the polymeric carrier component includes a polyolefin polymer containing at least about 50 wt % of a first α-olefin based on the total weight of the polyolefin polymer;
  the chain scission catalyst component includes a chain scission catalyst selected from the group consisting of an alkaline-earth metal hydroxide, an alkali metal hydroxide, an alkaline-earth metal carbonate, an alkali metal carbonate, an alkaline-earth metal oxide, an alkali metal oxide, an alkali metal acetate, an alkaline-earth metal acetate, an alkaline-earth metal salt of amino caproic acid, an alkali metal salt of amino caproic acid, a metal salt of linear dimer amino caproic acid, a metal salt of linear trimer caproic acid, and any combination thereof; and
  the chain scission catalyst component is present at a concentration from about 0.1 wt. % to about 20 wt. % based on the total weight of the purge composition.

12. The reactive purge composition of claim 3, wherein the water generating component is present from about 0.1 to about 40 wt. % based on the total weight of the reactive purge composition.

13. The reactive purge composition of claim 12 wherein the water generating composition is dispersed throughout the polymeric carrier component.

14. The reactive purge composition of claim 4, wherein the reactive purge composition includes
  i) a plurality of first particles including a first portion of the polymeric carrier component and at least a portion of the chain scission catalyst component, and
  ii) a plurality of second particles including a second portion of the polymeric carrier component and at least a portion the water generating component,
  wherein the first particles and the second particles are different.

15. A process for preparing a reactive purge composition of claim 1, including the step of mixing the water generating component with the polymeric carrier component at a mixing temperature below a predetermined maximum mixing temperature, wherein the water generating compound is generally stable at the maximum mixing temperature.

16. A process for preparing a reactive purge composition of claim 14 including the step of dry blending at a temperature below the onset melting temperature of the polymeric carrier component a plurality of first particles including a first portion of the polymeric carrier component and the chain scission catalyst component, and a plurality of particles including a second portion of the polymeric carrier component.

17. A process for purging a polymer extruder comprising the steps of:
  i) extruding a first processing resin at a first predetermined processing temperature, wherein the first predetermined processing temperature is greater than about 200° C.; and
  ii) extruding the reactive purge composition of claim 1 at a second predetermined processing temperature, wherein the second predetermined processing temperature is greater than about 200° C.;
    wherein the second predetermined processing temperature is the same as, or different from the first predetermined processing temperature.

18. A process of claim 17, wherein the first processing resin includes a polyamide, a polyester, an EVOH, or any combination thereof.

19. A process of claim 17, wherein the first processing resin includes a polyamide.

20. A process of any of claim 17, wherein the weight average molecular weight of the first processing resin is reduced by 20-95%.

21. A process of claim 17, wherein the second predetermined processing temperature is less than about 290° C.

22. A process of claim 17 further comprising a step of extruding a polyolefin homopolymer or a polyolefin copolymer, such that at least some of the reactive purge composition is removed from the polymer processing equipment.

23. A process of claim 17, wherein the ratio of the melt flow rate of the first processing resin to the melt flow rate of the reactive purge composition, as measured according to ASTM D1239-04 at 235° C./1.00 kg, is from about 20:1 to about 1:20.

24. A process of claim 17, wherein the water generating component generates at least about 0.1 wt. % water based on the total weight of the reactive purge composition.

* * * * *